US008571001B2

(12) United States Patent
Ogawa et al.

(10) Patent No.: US 8,571,001 B2
(45) Date of Patent: Oct. 29, 2013

(54) RADIO COMMUNICATION BASE STATION APPARATUS AND RADIO COMMUNICATION MOBILE STATION APPARATUS

(75) Inventors: Yoshihiko Ogawa, Kanagawa (JP); Daichi Imamura, Kanagawa (JP); Ayako Horiuchi, Kanagawa (JP); Sadaki Futagi, Ishikawa (JP)

(73) Assignee: Panasonic Corporation, Osaka (JP)

(*) Notice: Subject to any disclaimer, the term of this patent is extended or adjusted under 35 U.S.C. 154(b) by 1145 days.

(21) Appl. No.: 12/295,260

(22) PCT Filed: Mar. 29, 2007

(86) PCT No.: PCT/JP2007/056950
§ 371 (c)(1),
(2), (4) Date: Sep. 29, 2008

(87) PCT Pub. No.: WO2007/119591
PCT Pub. Date: Oct. 25, 2007

(65) Prior Publication Data
US 2010/0246559 A1    Sep. 30, 2010

(30) Foreign Application Priority Data

Mar. 31, 2006    (JP) .................................. 2006-099914

(51) Int. Cl.
*H04J 3/00*    (2006.01)
(52) U.S. Cl.
USPC .......................... 370/345; 370/443; 455/452.2
(58) Field of Classification Search
USPC ......... 370/345, 222, 337, 229, 332, 431, 436; 455/450, 452, 452.2; 22/345, 222, 337, 22/229, 332, 431, 436
See application file for complete search history.

(56) References Cited

U.S. PATENT DOCUMENTS

| 7,522,544 B2* | 4/2009 | Cheng et al. ................... 370/310 |
| 7,593,384 B2* | 9/2009 | Cheng ........................... 370/343 |
| 2002/0159414 A1* | 10/2002 | Kanemoto et al. ............. 370/335 |
| 2004/0081076 A1* | 4/2004 | Goldstein et al. .............. 370/208 |

(Continued)

FOREIGN PATENT DOCUMENTS

| JP | 2004-159345 | 6/2004 |
| JP | 2004-537875 | 12/2004 |

(Continued)

OTHER PUBLICATIONS

International Search Report dated May 22, 2007 in English.

*Primary Examiner* — Kevin C Harper
*Assistant Examiner* — Henry Baron
(74) *Attorney, Agent, or Firm* — Dickinson Wright PLLC

(57) ABSTRACT

A radio communication base station device can efficiently obtain a multiuser diversity gain from frequency scheduling while reducing the amount of a reference signal occupying an uplink. In the device, a grouping section (109) divides a plurality of RBs (Resource Blocks) into a plurality of RB groups. An RB group control unit (108) performs a control to change the correspondence relationship between the RBs and the RB groups with time. When the grouping section (109) divides the RBs into the RB groups, the RB control unit (108) performs a control to change a combination of the RBs included in each of the RB groups with time. A scheduling section (110) performs a scheduling of allocating each of a plurality of mobile stations to each of the RBs in each of the RB groups according to the reception quality of the reference signal.

20 Claims, 17 Drawing Sheets

(56) References Cited

U.S. PATENT DOCUMENTS

2004/0097238 A1  5/2004  Hwang
2005/0220002 A1* 10/2005 Li et al. .................. 370/208
2006/0014554 A1  1/2006  Gerlach
2006/0056451 A1  3/2006  Yano
2009/0131064 A1* 5/2009  Khan ..................... 455/452.1

FOREIGN PATENT DOCUMENTS

| | | |
|---|---|---|
| JP | 2006-033826 | 2/2006 |
| JP | 2006-067572 | 3/2006 |
| WO | 2006/025773 | 3/2006 |

* cited by examiner

|  | RB1, RB2, RB3 | RB4, RB5, RB6 | RB7, RB8, RB9 |
|---|---|---|---|
|  | GROUP α | GROUP β | GROUP γ |

FIG.4

| | SUBFRAME N | SUBFRAME N+1 |
|---|---|---|
| GROUP α | RB1 RB2 | RB2 RB3 |
| GROUP β | RB3 RB4 | RB4 RB5 |
| GROUP γ | RB5 RB6 | RB6 RB7 |
| GROUP ζ | RB7 RB8 | RB8 RB1 |

FIG.12

|  | SUBFRAME N | SUBFRAME N+1 | SUBFRAME N+2 | SUBFRAME N+3 | SUBFRAME N+4 | SUBFRAME N+5 | SUBFRAME N+6 |
|---|---|---|---|---|---|---|---|
| GROUP α | RB1 RB5 | RB1 RB3 | RB1 RB7 | RB1 RB2 | RB1 RB6 | RB1 RB4 | RB1 RB8 |
| GROUP β | RB2 RB6 | RB2 RB4 | RB2 RB8 | RB3 RB4 | RB2 RB5 | RB2 RB3 | RB2 RB7 |
| GROUP γ | RB3 RB7 | RB5 RB7 | RB3 RB5 | RB5 RB6 | RB3 RB8 | RB5 RB8 | RB3 RB6 |
| GROUP ζ | RB4 RB8 | RB6 RB8 | RB4 RB6 | RB7 RB8 | RB4 RB7 | RB6 RB7 | RB4 RB5 |

FIG.13

RADIO COMMUNICATION BASE STATION APPARATUS AND RADIO COMMUNICATION MOBILE STATION APPARATUS

TECHNICAL FIELD

The present invention relates to a radio communication mobile station apparatus (hereinafter simply "mobile station") that transmits a reference signal and a radio communication base station apparatus (hereinafter simply "base station") that carries out scheduling based on the received quality of the reference signal.

BACKGROUND ART

A multicarrier transmission system where communication is carried out using a plurality of frequency carriers, frequency scheduling is performed taking into account the frequency selectivity of multipath fading channels to improve throughput.

For efficient uplink frequency scheduling, a base station needs to learn the received qualities of all resource blocks (hereinafter simply "RB's") in all mobile stations and so all mobile stations need to transmit reference signals using all RB's. A reference signal refers to a known signal set in advance between the base station and the mobile stations or a signal according to this known signal. Further, a reference signal is also referred to as a "pilot signal."

FIG. 1 shows a conventional scheduling method. The base station measures the received quality of each RB using the reference signals transmitted from mobile stations A and B and assigns RB's for data transmission to mobile stations A and B based on the received qualities (see, for example, Non-Patent Document 1).

Non-Patent Document 1: "Investigations on Packet Scheduling Exploiting Frequency Selectivity in Uplink Radio Access," Yoshiaki Ofuji, Akihito Morimoto, Kenichi Higuchi, Mamoru Sawahashi, the Institute of Electronics, Information and Communication Engineers Society Conference, B-5-51, pp 451, March 2005.

DISCLOSURE OF INVENTION

Problems to be Solved by the Invention

However, according to the conventional scheduling method, all mobile stations need to transmit reference signals per subframe using all RB's, and so the amount of reference signals occupying the uplink increases following the increase in the number of mobile stations. As a result, the region for data transmission becomes smaller and throughput decreases (see FIG. 2).

It is therefore an object of the present invention to provide a base station and mobile station that are able to reduce the amount of reference signals occupying the uplink and efficiently achieve multiuser diversity gain by frequency scheduling.

Means for Solving the Problem

The base station according to the present invention employs a configuration including: a grouping section that divides a plurality of RB's into a plurality of groups; a scheduling section that, in the plurality of groups, carries out scheduling to assign a plurality of mobile stations to the plurality of RB's based on received qualities of reference signals transmitted from the plurality of mobile stations; a controlling section that changes correspondences between the plurality of RB's and the plurality of groups over time; and a transmitting section that transmits a report of a scheduling result to the plurality of mobile stations.

The mobile station according to the present invention employs a configuration including: a receiving section that receives a report of a scheduling result from the base station; and a transmitting section that transmits a reference signal using a RB in a group to which the mobile station belongs out of a plurality of groups, to the base station and transmits data using a RB matching the scheduling result, to the base station.

Advantageous Effect of the Invention

According to the present invention, a base station groups a plurality of RB's and carries out scheduling on a per RB group basis to assign RB's to the mobile stations, so that it is possible to reduce the amount of reference signals compared to a case where grouping is not carried out. Further, given that each group employs a unique assignment of RB's, the scheduling result of a given group does not influence the scheduling results of other groups, so that each mobile station can be assigned in a reliable manner to one of RB's where reference signals have been transmitted. Further, by changing the correspondences between a plurality of RB's and a plurality of groups over time, the RB that each mobile station can refer to changes, so that it is possible to efficiently achieve multiuser diversity gain. Furthermore, each mobile station transmits the reference signal by limiting RB's to the RB's included in a group to which the mobile station belongs, thereby reducing the amount of reference signals transmitted in each subframe.

BRIEF DESCRIPTION OF DRAWINGS

FIG. 4 is a specific example of RB group information according to Embodiment 1;

FIG. 12 is an example of a table according to Embodiment 3;

FIG. 13 is another example of a table according to Embodiment 3;

BEST MODE FOR CARRYING OUT THE INVENTION

Embodiments of the present invention will be described in detail below with reference to the accompanying drawings. With the following embodiments, the band used for the uplink is divided into a plurality of RB's, and a mobile station communicates with a base station using one or a plurality of RB's.

Embodiment 1

Figure 1:
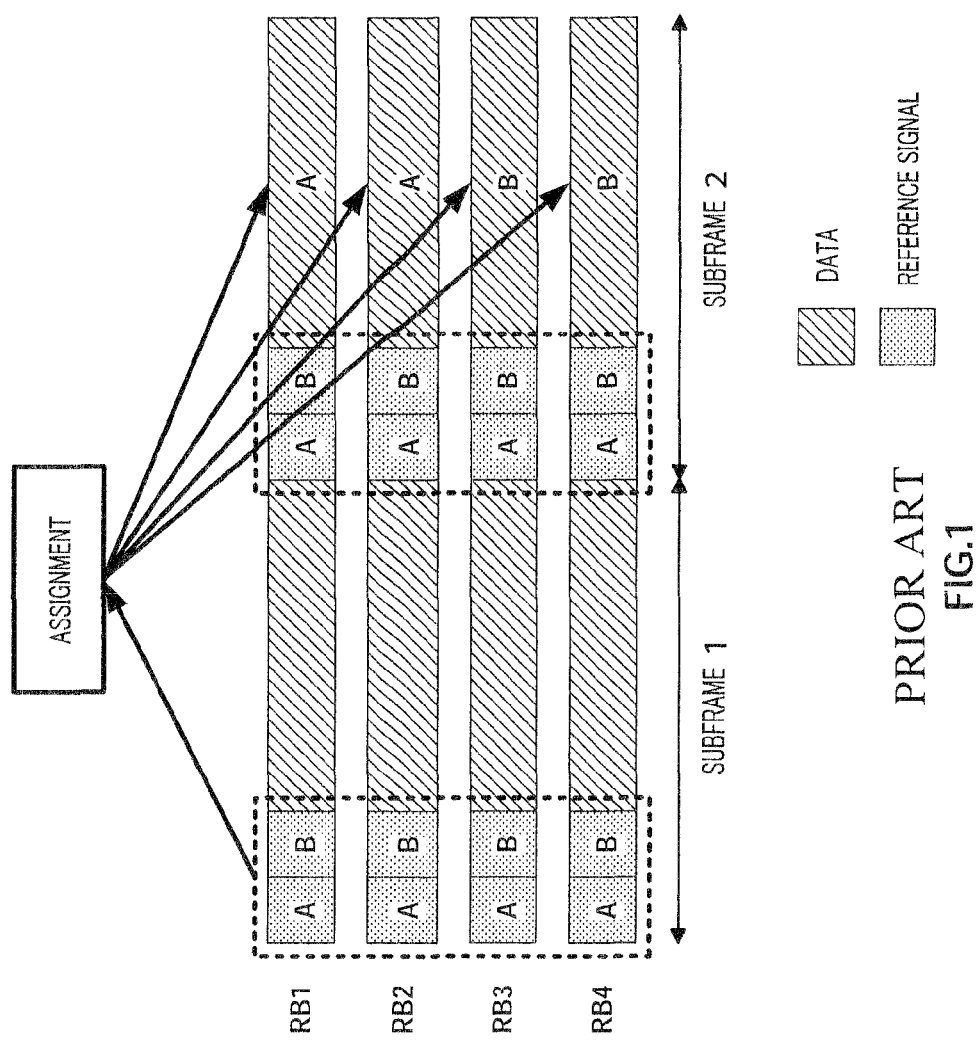
FIG. 1 shows a conventional scheduling method.
Figure 2:
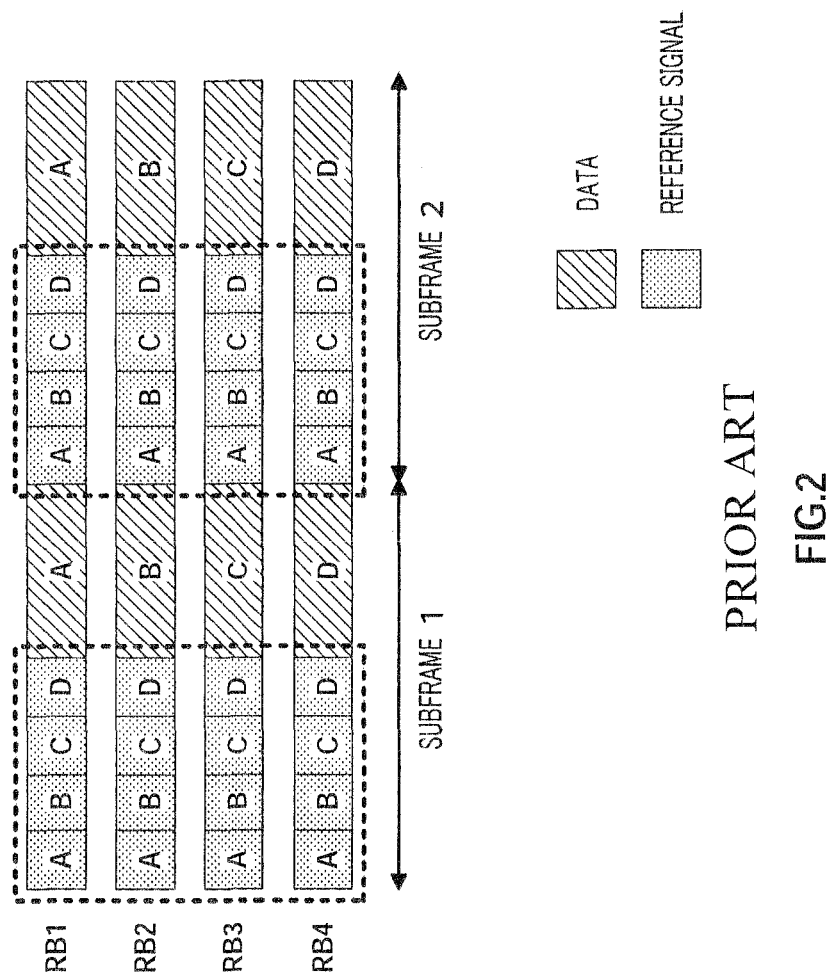
FIG. 2 shows the relationship between the number of mobile stations and the amount of reference signals in the conventional scheduling method.
Figure 3:
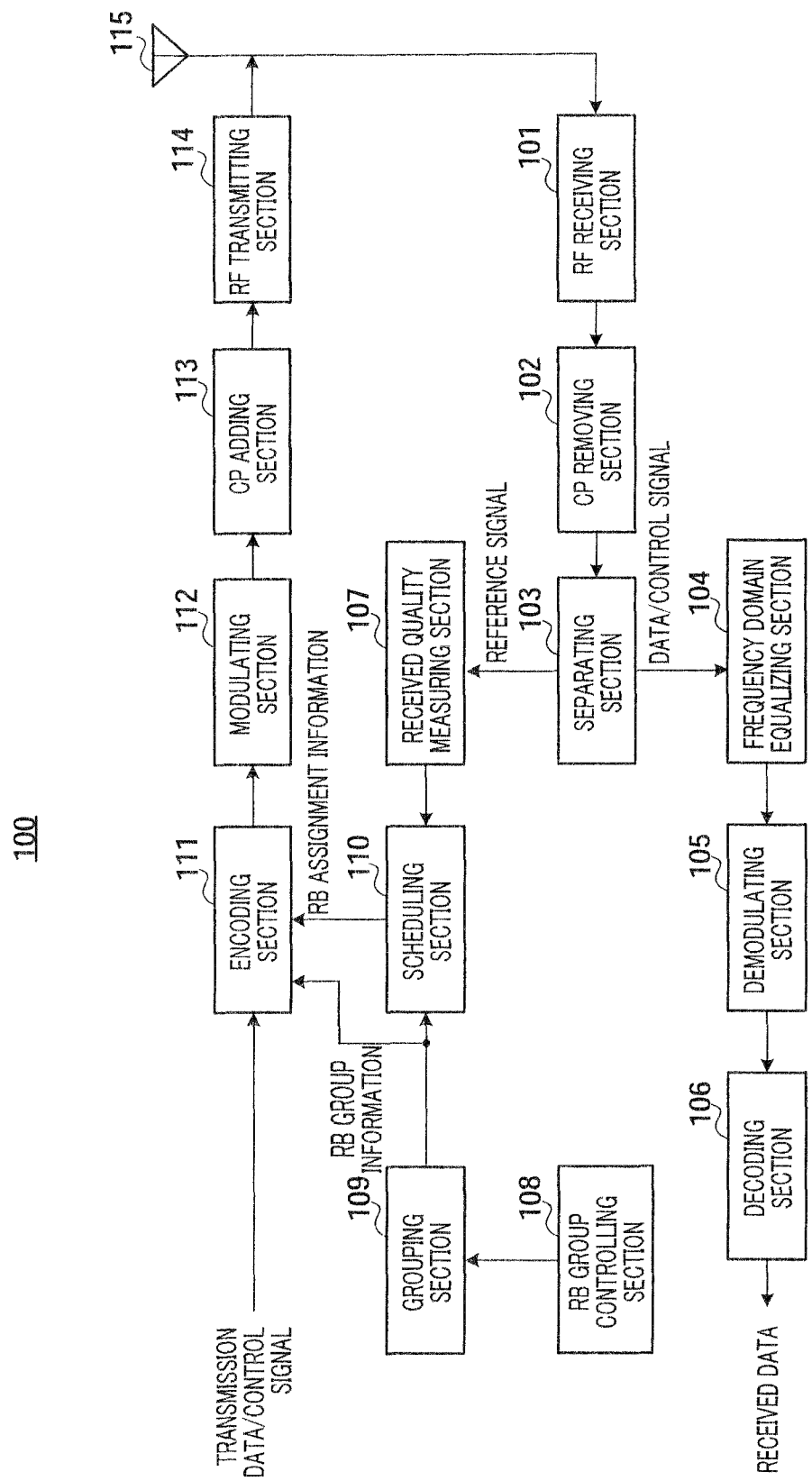
FIG. 3 is a block diagram showing a configuration of a base station according to Embodiment 1.

FIG. 3 is a block diagram showing a configuration of base station 100 according to the present embodiment.

RF receiving section 101 carries out predetermined radio reception processing such as down-conversion and A/D conversion on a signal received through antenna 115 and outputs the signal to CP removing section 102.

CP removing section 102 removes the CP (Cyclic Prefix) portion from the signal outputted from RF receiving section 101 based on the synchronization timing and outputs the signal to separating section 103.

Separating section 103 separates the signal outputted from CP removing section 102 to the reference signal and a data/control signal, and outputs the reference signal to received quality measuring section 107 and the data/control signal to frequency domain equalizing section 104.

Frequency domain equalizing section 104 compensates the distortion of the signal outputted from separating section 103 per one block length by equalizing the distortion in the frequency domain and outputs the compensated signal to demodulating section 105.

Demodulating section 105 carries out a constellation point decision on the data/control signal and outputs the signal after the decision to decoding section 106.

Decoding section 106 obtains received data by performing error correcting processing.

Received quality measuring section 107 measures the received quality of each RB per mobile station using the reference signal outputted from separating section 103 and reports the measurement result to scheduling section 110.

Grouping section 109 groups a plurality of RB's into a plurality of RB groups. By this grouping processing, a plurality of RB groups and the RB's included in these RB groups are determined. Hereinafter, information showing the correspondences between RB's and RB groups will be referred to as "RB group information." RB group information is outputted to scheduling section 110 and encoding section 111.

FIG. 4 shows a specific example of RB group information. In this example, nine RB's (RB1 to RB9) are divided into three RB groups of group α, group β and group γ, and RB1 to RB3 are grouped into group α, RB4 to RB6 are grouped into group β and RB7 to RB9 are grouped into group γ.

RB group controlling section 108 carries out a control for changing the correspondences between a plurality of RB's and a plurality of RB groups over time. To be more specific, when grouping section 109 groups a plurality of RB's into a plurality of RB groups, RB group controlling section 108 carries out a control for changing the combinations of RB's included in a plurality of RB groups over time. By this control, the RB's included in each RB group are not fixed and rearranged over time.

Scheduling section 110 carries out scheduling for assigning a plurality of mobile stations to a plurality of RB's in RB groups based on the received qualities reported from received quality measuring section 107. The reference signal from each mobile station inputted to received quality measuring section 107 is transmitted by limiting RB's based on the reported RB group information, and so scheduling section 110 specifies the RB's included in each RB group according to this RB group information, carries out scheduling individually for each RB group and assigns the RB for data transmission to each mobile station. Hereinafter, information showing the correspondences between a plurality of mobile stations and the RB's assigned to these mobile stations will be referred to as "RB assignment information." RB assignment information is outputted to encoding section 111.

Encoding section 111 performs error correcting encoding processing on the transmission data, control signal, RB group information and RB assignment information that are inputted.

Modulating section 112 modulates data sequences to be inputted by modulation schemes such as PSK modulation and QAM modulation.

CP adding section 113 generates the CP by copying a predetermined portion from the rear end of the data sequence outputted from modulating section 112 and adds the generated CP to the head of the block.

RF transmitting section 114 carries out predetermined radio transmission processing such as D/A conversion and up-conversion on the signal outputted from CP adding section 113 and transmits the signal through antenna 115.

In this way, base station 100 divides a plurality of RB's into a plurality of RB groups, carries out scheduling for assigning a plurality of mobile stations to a plurality of RB's based on the received qualities of reference signals transmitted from a plurality of mobile stations and reports the scheduling result to a plurality of mobile stations. Then, base station 100 changes the correspondences between a plurality of RB's and a plurality of RB groups over time.

By this means, scheduling is performed by limiting each RB group and each mobile station group has only to transmit reference signals using RB's included in the RB group to which each mobile station belongs, so that it is possible to decrease the number of reference signals occupying the uplink. Further, given that scheduling is carried out individually per RB group, the scheduling result of a given RB group does not influence the scheduling results of other RB groups, and each mobile station can be assigned in a reliable manner to one of RB's where the reference signals have been transmitted, so that all mobile stations are able to build stable communication. Further, by changing the correspondences between a plurality of RB's and a plurality of RB groups over time, the RB's included in each RB group change, so that the RB to which each mobile station can be assigned changes over time. Consequently, it is possible to efficiently achieve multiuser diversity gain.

Figure 5:
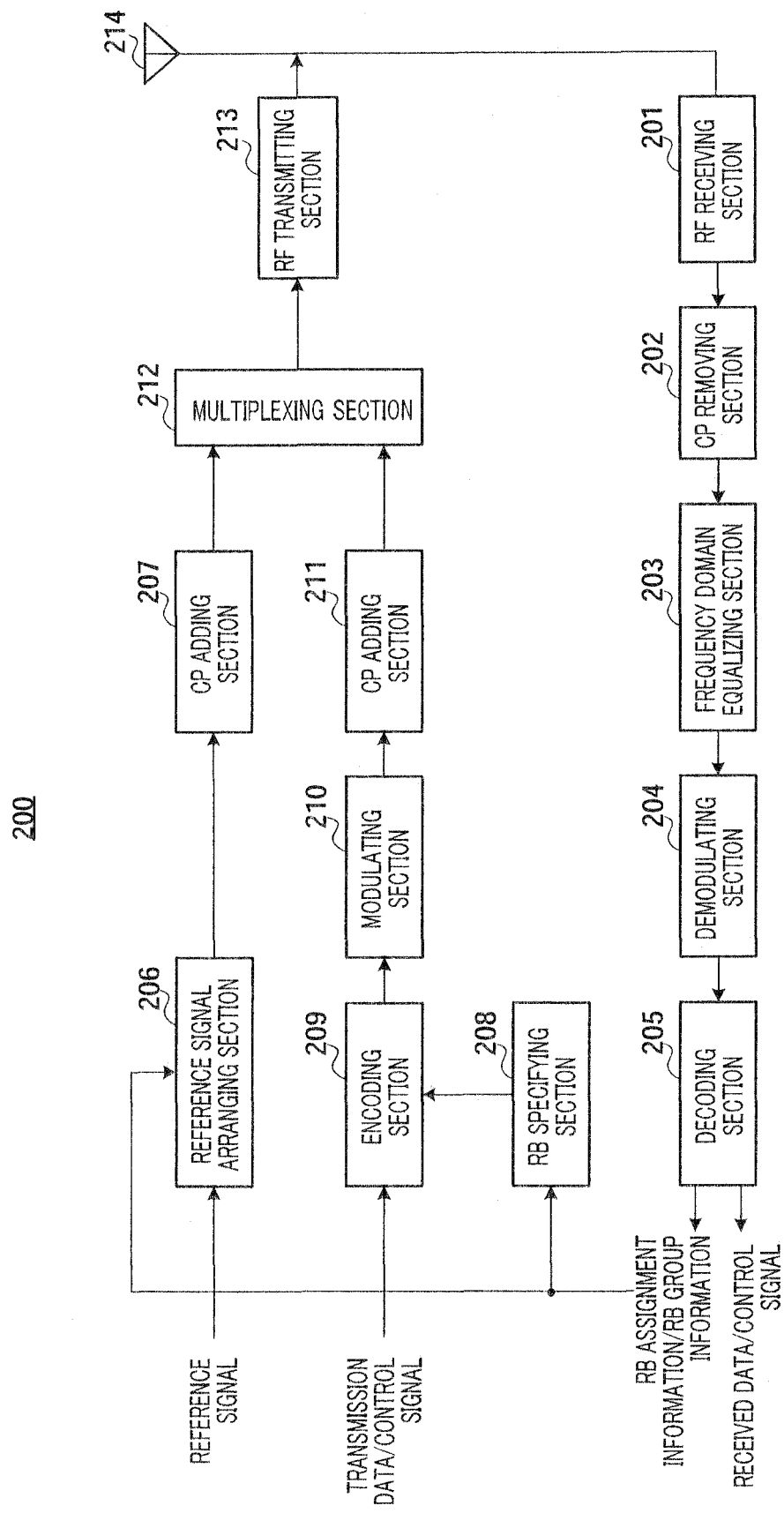
FIG. 5 is a block diagram showing a configuration of a mobile station according to Embodiment 1.

FIG. 5 is a block diagram showing a configuration of mobile station 200 according to the present embodiment.

RF receiving section 201 carries out predetermined reception processing such as down-conversion and A/D conversion on the signal received through antenna 214 and outputs the signal to CP removing section 202.

CP removing section 202 removes the CP portion from the signal outputted from RF receiving section 201 based on the synchronization timing and outputs the signal to frequency domain equalizing section 203.

Frequency domain equalizing section 203 compensates the distortion of the signal outputted from CP removing section 202 by equalizing the distortion per one block length in the frequency domain and outputs the compensated signal to demodulating section 204.

Demodulating section 204 carries out a constellation point decision on the data/the control signal and outputs the signal after the decision to decoding section 205.

Decoding section 205 performs error correcting processing to obtain received data, the control signal, RB group information and RB assignment information.

Based on the reported RB group information, reference signal arranging section 206 arranges a reference signal in the RB in the RB group to which the mobile station belongs.

Further, when deciding to which RB group the mobile station belongs, reference signal arranging section 206 may use, for example, the RB group including the RB in which data is currently transmitted as the RB group to which the mobile station belongs. By specifying the RB group to which the mobile station belongs in this way, the reference signal is transmitted using a plurality of RB's including the RB in which the data is currently transmitted. Consequently, the base station refers to the received quality of the current RB and the received qualities of other RB's and then carries out scheduling per RB group, so that it is possible to achieve greater throughput than the current throughput in all RB groups. Further, in what order each mobile station arranges the reference signal in the RB included in the RB group is set in advance.

CP adding section 207 generates the CP by copying a predetermined portion from the rear end of the reference signal outputted from reference signal arranging section 206 and adds the generated CP to the head of the block.

RB specifying section 208 specifies the RB's for data transmission. To be more specific, RB specifying section 208 specifies RB's in which transmission data and control signals are arranged, based on the combination of RB group information and RB assignment information. Further, the RB group information used then is the RB group information used when scheduling is carried out to generate RB assignment information.

Encoding section 209 arranges the transmission data and control signals that are inputted, in the RB's specified in RB specifying section 208 and performs error correcting encoding processing.

Modulating section 210 modulates transmission data sequences outputted from encoding section 209 by modulation schemes such as PSK modulation and QAM modulation.

CP adding section 211 generates the CP by copying a predetermined portion from the rear end of the signal outputted from modulating section 210 and adds the generated CP to the head of the block.

Multiplexing section 212 time-multiplexes the reference signal outputted from CP adding section 207 and the data signal outputted from CP adding section 211, and then outputs the result to RF transmitting section 213.

RF transmitting section 213 carries out predetermined radio transmission processing such as D/A conversion and up-conversion on the signal outputted from multiplexing section 212 and transmits the signal through antenna 214.

In this way, mobile station 200 receives a report of the scheduling result and a report of the correspondences between a plurality of RB's and a plurality of RB groups from the base station, transmits the reference signal using RB's in the RB group in a plurality of RB groups to which mobile station 200 belongs and transmits data using RB's according to the scheduling result, to base station 100.

By limiting RB's for transmitting reference signals as described above, it is possible to reduce the amount of reference signals. Further, by changing RB group information periodically (for example, per subframe or over a plurality of subframes), it is possible to transmit reference signals periodically from mobile stations using different RB's and efficiently achieve multiuser diversity gain.

Figure 6:
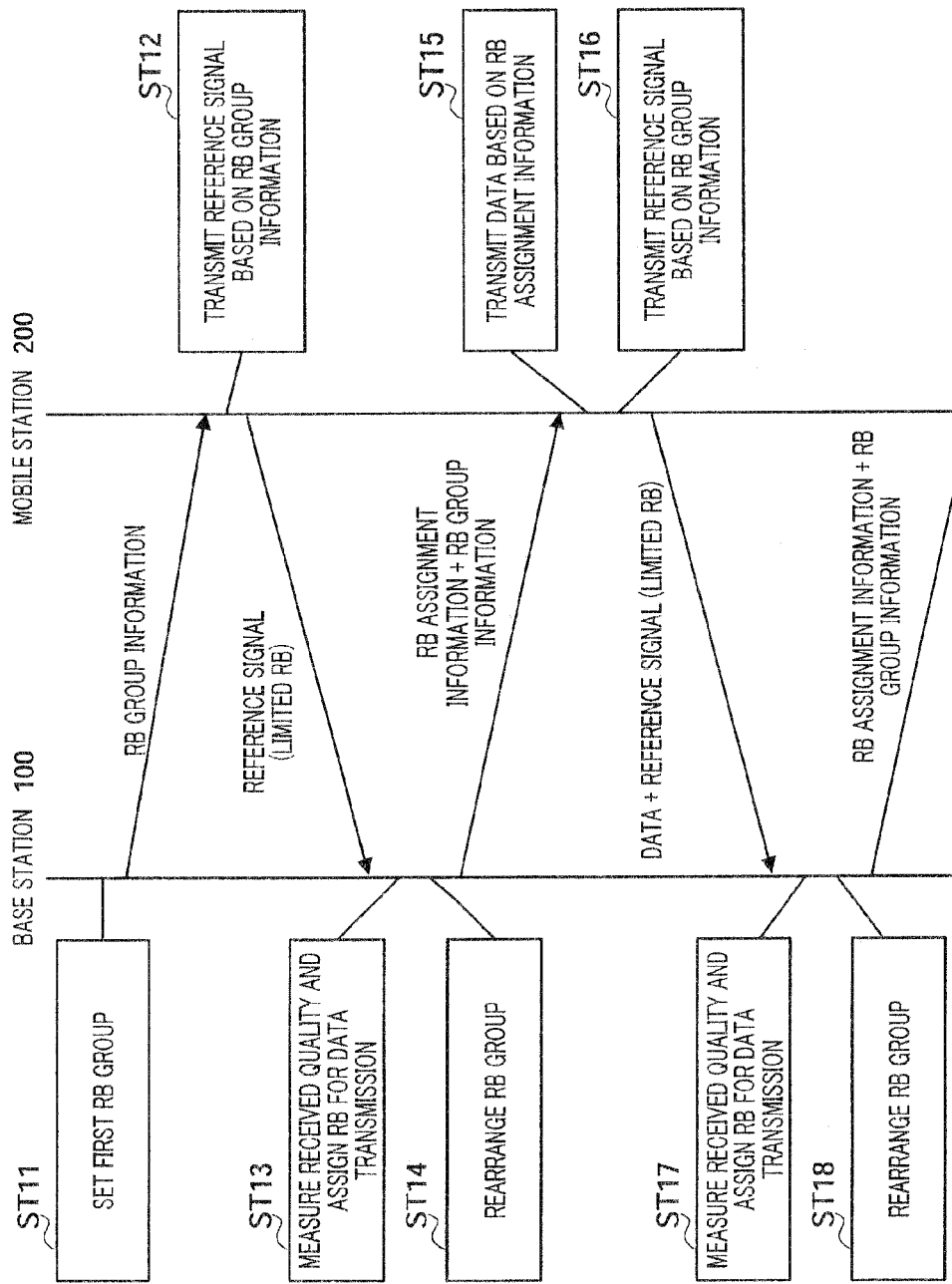
FIG. 6 is an operation sequence according to Embodiment 1.

Next, FIG. 6 shows the operation sequence according to the present embodiment.

Base station 100 sets the first RB group in ST11 and reports this RB group information to mobile station 200.

In ST12, mobile station 200 transmits a reference signal using RB's in the RB group to which mobile station 200 belongs and which is indicated by the RB group information.

Base station 100 measures the received quality of the reference signal transmitted from each mobile station and assigns the RB for transmitting uplink data in ST13, and reports this RB assignment information to mobile station 200. Further, base station 100 rearranges and resets the RB groups in ST14, and reports new RB group information to mobile station 200.

Mobile station 200 transmits data based on RB assignment information in ST15. Further, mobile station 200 transmits the reference signal based on RB group information in ST16.

The processing in ST17 is the same as the processing in ST13, and the processing in ST18 is the same as the processing in ST14.

In this way, with the present embodiment, the correspondences between RB's and RB groups are changed periodically.

Next, the operation of the communication system according to the present embodiment will be described using FIG. 7.

As described above, the present embodiment limits RB's for transmitting reference signals to the RB's in an RB group reported from the base station, the combination of RB's forming this RB group is changed periodically. The following description assumes that the number of RB's is four, the number of mobile stations is four and the number of RB groups is two, and each mobile station transmits the reference signal using two of four RB's. In FIG. 7, in subframe 1, RB1 and RB2 form the first RB group and RB3 and RB4 form the second RB group. At times Tn and Tn+1, each mobile station transmits the reference signal by limiting RB's to the RB included in the RB group. That is, mobile station A and mobile station B transmit reference signals by limiting RB's to RB1 and RB2, and mobile station C and mobile station D transmit reference signals by limiting RB's to RB3 and RB4.

Figure 7:
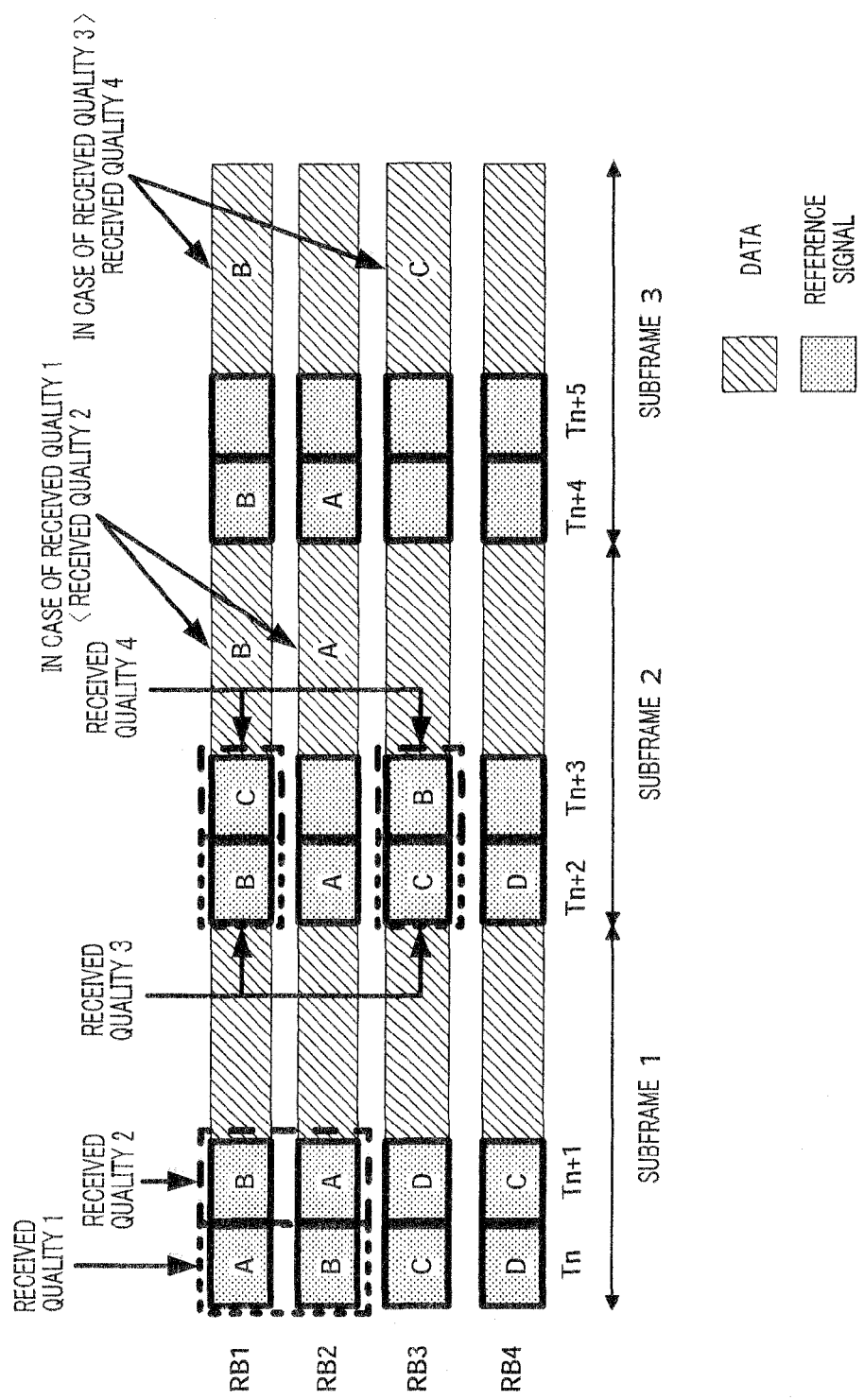
FIG. 7 is an operation diagram of a communication system according to Embodiment 1.

Further, in FIG. 7, the number of RB's in the RB group is two, and so reference signals are transmitted twice at times Tn and Tn+1 in one subframe. However, the time for transmitting reference signals is not limited to these two times.

Next, the base station compares the received quality of each RB group measured using the reference signal transmitted from each mobile station and determines the RB for data transmission to be assigned to each mobile station. The RB for data transmission is determined from one of the RB's in the RB group to which each mobile station belongs. For example, in FIG. 7, RB1 and RB2 form one RB group in subframe 1, and so RB's for data transmission are assigned to RB1 and RB 2 for mobile station A and mobile station B.

In this case, to compare the received qualities, a method of comparing the total SINR of each RB group and selecting an RB arrangement of a high total SINR and other method may be used. In subframe 1 in FIG. 7, by comparing received quality 1 at time Tn (i.e. the total SINR value obtained by adding the SINR of RB1 in mobile station A and the SINR of RB2 in mobile station 2) and received quality 2 at time Tn+1 (i.e. the total SINR value obtained by adding the SINR of RB1 in mobile station B and the SINR of RB2 in mobile station A), arrangement of mobile stations of the greater total SINR value is used for an arrangement of the RB for data transmission in subframe 2. If received quality 2 is greater than received quality 1, the RB's for data transmission in subframe 2 are arranged as in the arrangement for received quality 2, that is, mobile station B is assigned to RB1 and mobile station A is assigned to RB2. The same comparison is drawn in the RB group of RB3 and RB4, and arrangement of the RB's for data transmission is determined for mobile stations. In this way, with the present embodiment, in each of a plurality of RB groups, scheduling is carried out so as to maximize the addition result of the SINR's of the reference signals of a plurality of mobile stations.

Further, the priority may be set to each mobile station and the SINR may be weighted according to the priority. Further, RB's may be assigned to mobile stations per RB group in order from a higher priority. Further, the priority of each mobile station may be set according to the QoS (Quality of Service) of transmission data of each mobile station, the moving speed of each mobile station, the distance between the base station and each mobile station, the number of mobile stations in the communication system, the CQI (Channel Quality Indicator) of each mobile station and the average CQI. By carrying out scheduling taking into account priorities in this way, more flexible and adequate RB assignment is possible.

Next, the base station reports RB assignment information showing an RB for data transmission as the scheduling result, to each mobile station. Each mobile station specifies the RB for data transmission based on RB assignment information. Then, each mobile station assigns data to this RB for data transmission and transmits this data. Further, RB assignment information is generated for each RB group where the reference signal has been transmitted in an earlier subframe, and so a mobile station is able to learn the RB for data transmission by utilizing the RB group information of the earlier subframe.

The sequence of these operations is repeated periodically (for example, per subframe or over a plurality of subframes) changing the combination of RB's forming an RB group. That is, in FIG. 7, while, in subframe 1, RB1 and RB2 form the first RB group and RB3 and RB4 form the second group, in subframe 2, RB1 and RB3 form the first RB group and RB2 and RB4 form the second RB group. In this way, with the present embodiment, the above operation is repeated by rearranging the combination of RB's forming each RB group.

As described above, it is possible to reduce the amount of reference signals in each subframe by limiting transmission of reference signals to RB groups, and is possible to effectively achieve multiuser diversity gain by rearranging the combination of RB's forming each RB group periodically. Further, by resetting RB group information periodically and repeating the above processing, an arrangement of the RB for transmission data is updated over time, so that it is possible to track the RB for data transmission supporting the fluctuation over time.

Figure 8:
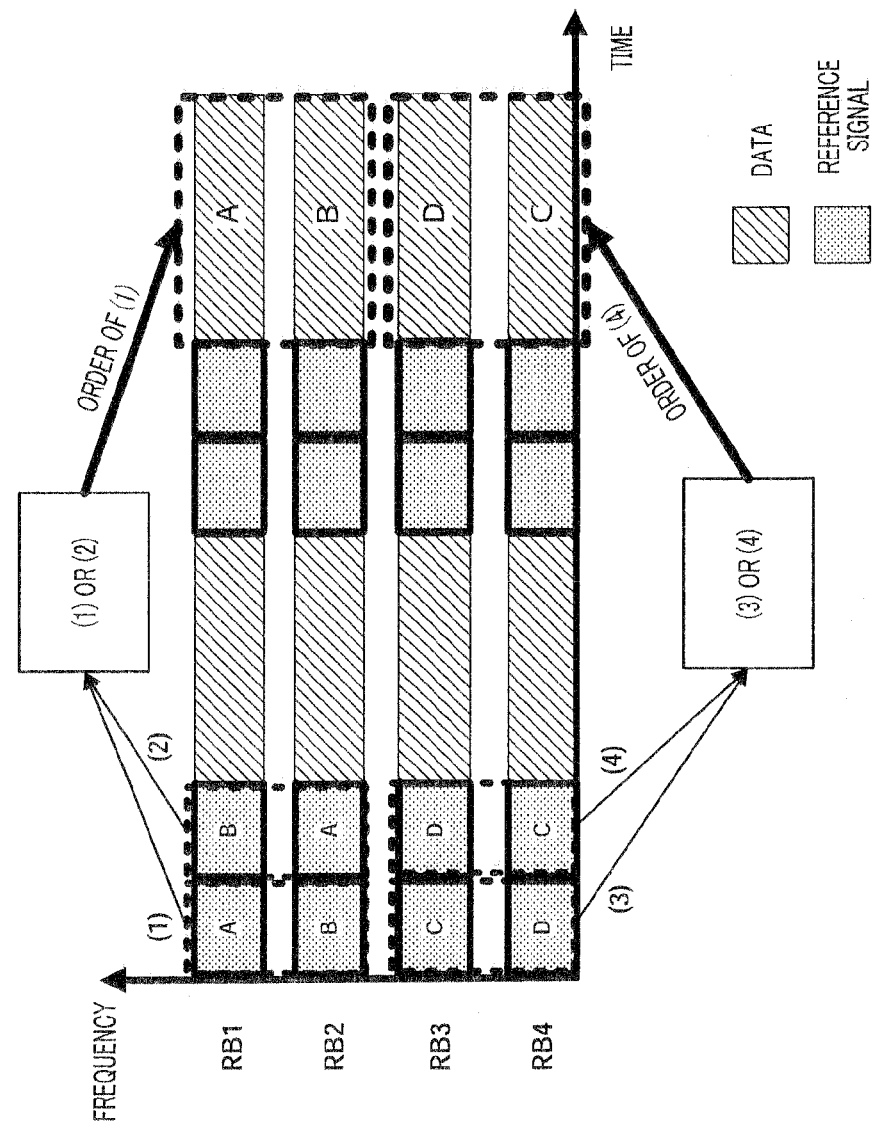
FIG. 8 is an illustrative diagram of RB assignment information according to Embodiment 1.

FIG. 8 is an illustrative diagram of RB assignment information. RB assignment information is generated per RB group in the base station using RB group information.

The base station determines the order of assignment of mobile stations in an RB group as array numbers and reports the array numbers selected on a per RB group basis as RB assignment information. For example, as shown in FIG. 8, if RB1 and RB2 form the first RB group and RB3 and RB4 form the second RB group, as RB assignment information, the base station only needs to report array number "1" (mobile station A and mobile station B are assigned to RB1 and RB2, respectively) or array number "2" (mobile station B and mobile station A are assigned to RB1 and RB2, respectively) in the first RB group and reports array number "3" (mobile station C and mobile station D are assigned to RB3 and RB4, respectively) or array number "4" (mobile station D and mobile station C are assigned to RB3 and RB4, respectively) in the second RB group.

In this way, the base station only needs to report RB assignment information per RB group, not per mobile station, so that it is possible to reduce the amount of RB assignment information. Further, instead of information showing all RB's, only information showing the order of assignment of mobile stations in an RB group is demanded as RB assignment information. Further, by arranging the RB's for data transmission in the same order as the RB's for transmitting reference signals, it is possible to reduce the amount of reported information.

Embodiment 2

When a plurality of RB's are divided into a plurality of RB groups, if the number of RB's included in one RB group is smaller, only a smaller number of RB's is required to transmit reference signals for mobile stations, so that it is possible to decrease the number of reference signals in the uplink. On the other hand, if the number of RB's included in one RB group is smaller, the number of RB's used by mobile stations in each subframe decreases, and so there is a case where multiuser diversity gain may not be efficiently achieved. In this way, the number of reference signals required and the efficiency of multiuser diversity gain are in the trade-off relationship.

Generally, for example, the moving speed and position of a mobile station, the QoS of transmission data and the number of mobile stations in a communication system vary depending on time, and so it is preferable to adaptively change the number of RB's included in one RB group depending on the situation.

Then, with the present embodiment, the number of RB's included in each RB group is changed over time.

Figure 9:
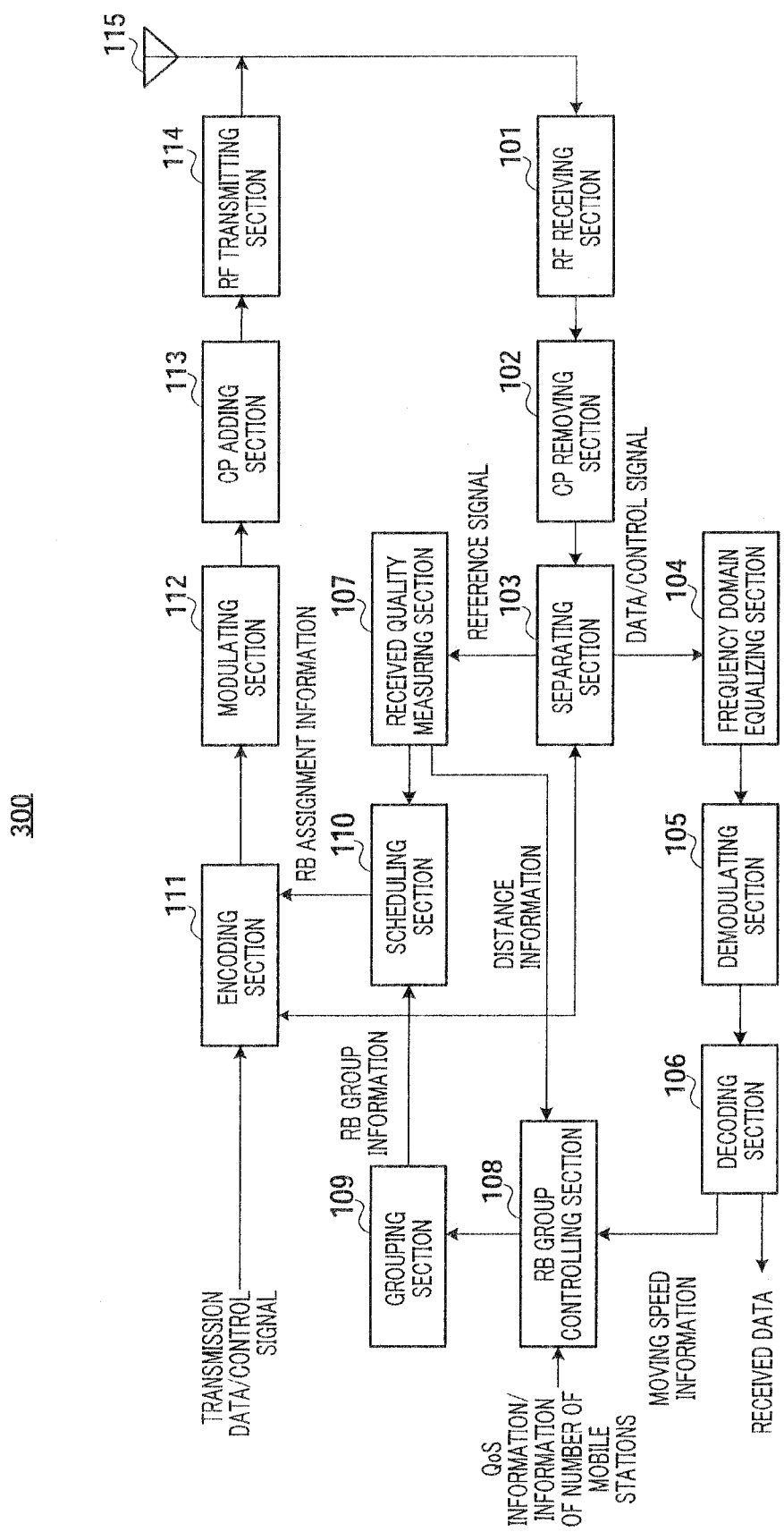
FIG. 9 is a block diagram showing a configuration of the base station according to Embodiment 2.

FIG. 9 is a block diagram showing a configuration of base station 300 according to the present embodiment. In the following description, only differences from Embodiment 1 will be described.

Separating section 103 separates a signal outputted from CP removing section 102 to the reference signal and a data/control signal, and outputs the reference signal to received quality measuring section 107 and the data/control signal to frequency domain equalizing section 104. Further, the number of RB's included in each RB group varies between subframes, and so RB group information is inputted to separating section 103 to correctly separate the reference signal from the received signal. Separating section 103 specifies the reference signal in the received signal and separates the reference signal based on the RB group information.

RB group controlling section 108 carries out a control for changing the correspondences between a plurality of RB's and a plurality of RB groups over time. In this case, RB group controlling section 108 receives, as input, for example, QoS information showing the QoS of transmission data, moving speed information showing the moving speed of each mobile station, distance information showing the distance between the base station and each mobile station and information of the number of mobile stations showing the number of mobile stations present in the communication system, and carries out a control for changing the number of RB's included in each RB group based on these pieces of information.

For example, recently, services provided in a mobile communication system range widely from an electronic mail, television telephone, and delivery of moving images in addition to a general telephone call, and the communication quality required by each service varies. Above all, in services such as a telephone call and television telephone call that require real-time processing, communication cannot be allowed to stop or delay, and so it is preferable to carry out frequency scheduling taking into account the QoS of transmission data. Then, by inputting QoS information to RB group controlling section 108, RB group controlling section 108 changes the number of RB's included in one RB group to satisfy the required QoS.

Further, it is effective to change the number of RB's based on moving speed information. For example, when most of the mobile stations in a communication system are moving at a low speed or are not moving, there is little fluctuation of received qualities between several subframes, and therefore, first, the number of RB's included in one RB group is set comparatively greater and, after most of the RB's are assigned stably, it is preferable to decrease the number of RB's included in one RB group to decrease the number of reference signals. Then, by providing in a mobile station the moving speed detecting section that detects the moving speed thereof, this mobile station reports the detected moving speed information to base station 300. RB group controlling section 108 changes the number of RB's included in one RB group based on the moving speed information decoded in decoding section 106.

Further, it is also effective to change the number of RB's based on the distance between the base station and each mobile station. For example, when there are a great number of mobile stations in a close distance to the base station, received power fluctuates significantly between these mobile stations, and so it is preferable to stabilize communication by placing an emphasis on effectively achieving multiuser diversity gain. Then, received quality measuring section 107 estimates the distance between the base station and each mobile station based on the received quality measured in received quality measuring section 107 and RB controlling section 108 changes the number of RB's included in one RB group based on distance information.

Further, it is also effective to change the number of RB's based on the number of mobile stations communicating with the base station, that is, the number of mobile stations present in the communication system. For example, if the number of mobile stations in the communication system is small, transmitting reference signals using a great number of RB's does not lead to decreased throughput, and so the number of RB's included in one RB group may be set greater.

Figure 10:
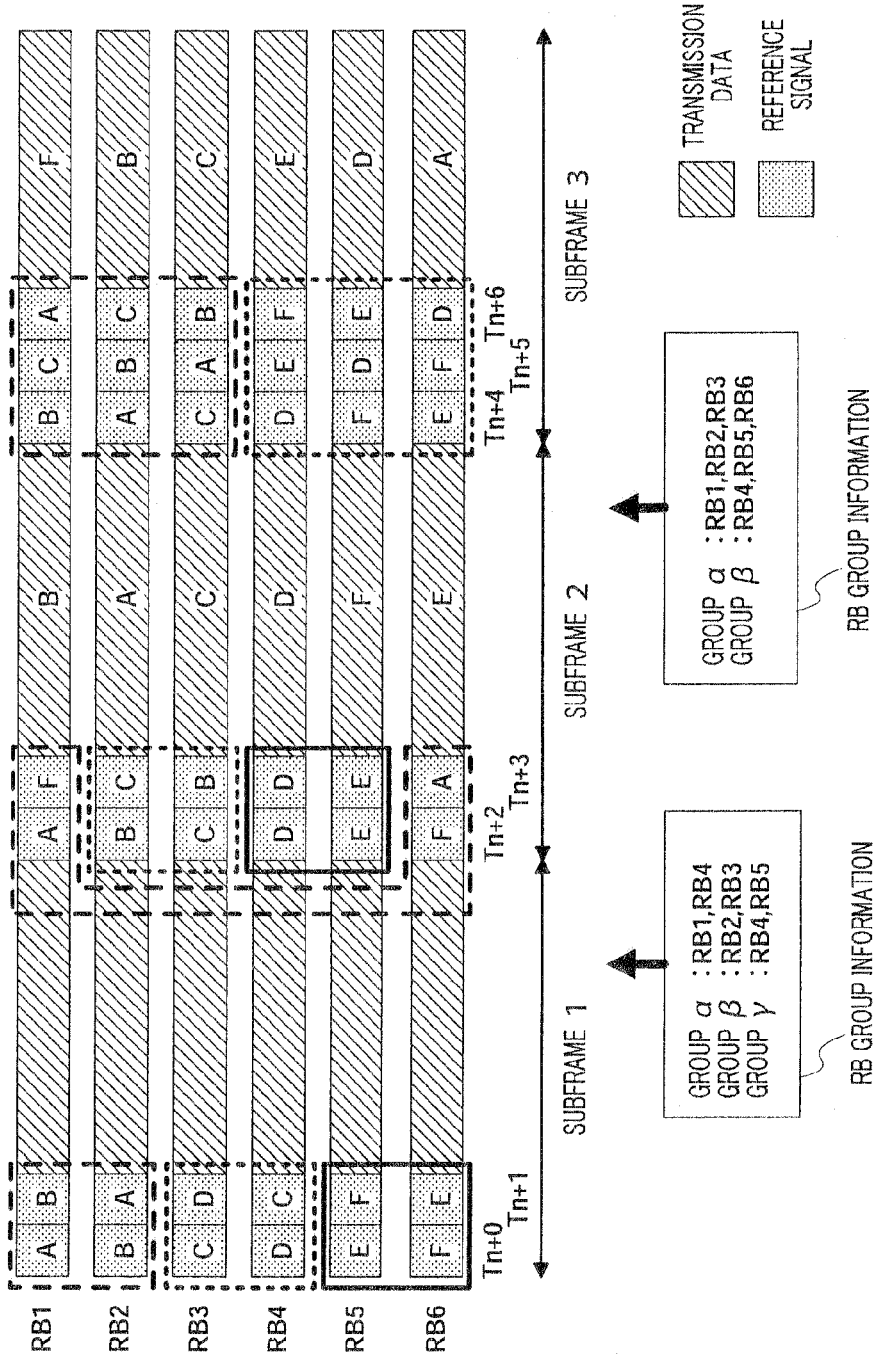
FIG. 10 is an operation diagram of the communication system according to Embodiment 2.

FIG. 10 is an operation diagram of the communication system according to the present embodiment. In subframes 1 and 2, six RB's (RB1 to RB6) are divided into three RB groups (groups α, β, and γ), and, in subframe 3, six RB's (RB1 to 6) are divided into two RB groups (groups α and β). The base station decides to switch the number of RB's included in one RB group using the above information somewhere prior to subframe 3, and changes the number of RB's to carry out grouping. In subframes 1 and 2, the number of RB's in each RB group is two, and so only the received qualities of two RB's can be obtained in each subframe. However, in subframe 3, the number of RB's in each RB group is three, and so the received qualities of three RB's can be obtained. For example, if RB's need to be restored to a preferable arrangement earlier, the number of RB's in the RB group is increased. Further, if the amount of reference signals needs to be decreased, the number of RB's in the RB group is decreased. These are decided by the base station. Further, it is also effective to transmit reference signals using all RB's at an initial stage and arrange RB's preferably, and then reduce the amount of reference signals by decreasing the number of RB's in the RB group.

As described above, by adaptively changing the number of RB's included in one RB group depending on the situation, it is possible to keep the balance between the number of reference signals and multiuser diversity and build stable communication.

Further, the number of RB's may be changed by RB group controlling section 108 based on one of QoS information, moving speed information, distance information and information of the number of mobile stations or combinations of these.

Further, the number of RB's may be changed by RB group controlling section 108 based on other information. For example, it is possible to change the number of RB's based on the CQI of each mobile station or the average CQI.

Further, if setting of a priority to each mobile station based on these pieces of information and scheduling according to a priority in scheduling section 110 are carried out in combination, it is possible to build stable communication.

Further, by blending and adaptively changing a case of forming one RB group with all RB's or a case of forming one RB group with one RB, it is possible to structure a more flexible communication system. For example, if the QoS of transmission data from all mobile stations is higher than a standard at a given time, it is also effective to form one RB group with all RB's and transmit reference signals from all mobile stations using all RB's. Further, by, for example, forming one RB group with one RB having a CQI higher than the standard, the amount of reference signals may be reduced.

Further, it is also effective to carry out optimal RB assignment by scheduling all RB's on a regular basis and carry out scheduling by grouping two RB's in one RB group in a subframe in which RB's are assigned optimally.

Embodiment 3

The above base station divides a plurality of RB's into a plurality of RB groups and changes the correspondences between RB's and RB groups over time. On the other hand, each mobile station needs to learn the RB's included in each current RB group, and therefore the base station needs to report RB group information to each mobile station every time the correspondences between RB's and RB groups change. However, if RB group information is reported frequently, the amount of reported information occupying the downlink increases and downlink throughput is likely to decrease.

Then, with the present embodiment, both of the base station and each mobile station have tables showing the correspondences between RB's and RB groups and the order of changes in the correspondences over time.

Figure 11:
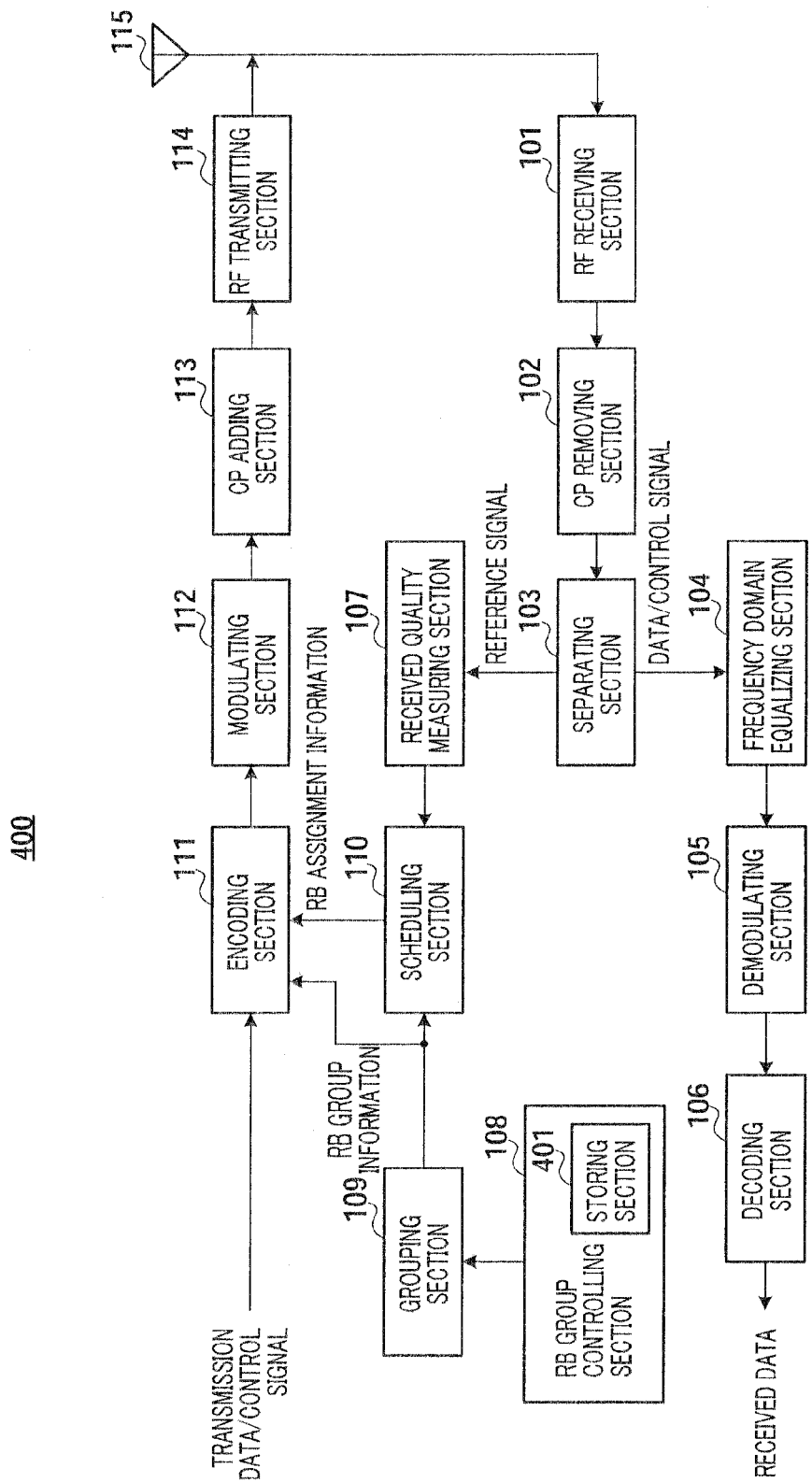
FIG. 11 is a block diagram showing a configuration of the base station according to Embodiment 3.

FIG. 11 is a block diagram showing a configuration of base station 400 according to the present embodiment. In the following description, only differences from Embodiment 1 will be described.

Storing section 401 stores a table showing the correspondences between RB's and RB groups and the order of changes in the correspondences over time.

RB group controlling section 108 controls grouping section 109 to change the correspondences between a plurality of RB's and a plurality of RB groups over time based on the table stored in storing section 401. On the other hand, the mobile station (not shown) according to the present embodiment has, in addition to the components shown in FIG. 5, a storing section that stores the same table as the table stored in storing section 401 of base station 400, specifies the RB in the RB group to which this mobile station belongs based on this table and transmits a reference signal to base station 400 using this RB.

FIG. 12 shows an example of the table. In this case, the number of RB's is eight (RB1 to RB8). This table divides eights RB's (RB1 to RB8) into four RB groups (groups α, β, γ and ζ), and, in a given subframe N, RB1 and RB2, RB3 and RB4, RB5 and RB6, and RB7 and RB8 each belong to the same group. In the next subframe N+1, RB2 and RB3, RB4 and RB5, RB6 and RB7, and RB8 and RB1 each belong to the same group. Then, when the group comes to the bottom of the table, the group returns to the top. That is, in the next subframe N+2, grouping of subframe N is employed.

In this way, with the present embodiment, the correspondences between RB's and RB groups and patterns of changes in the correspondences are set in the table, and RB group controlling section 401 carries out a control for changing the correspondences between a plurality of RB's and a plurality of RB groups over time based on this table.

FIG. 13 shows another table. This table is set such that adjacent RB's do not belong to the same RB group successively. To be more specific, in this table, each of RB1 to RB8 belongs to the same group once with each of the other seven RB's in one round, and the RB which is apart from the RB of the current pair is preferentially selected as the RB of the next pair.

For example, in subframe N, the mobile station assigned to RB1 also arranges the reference signal in RB5 which is apart from RB 1 by ½ of all eight RB's. Further, the mobile station assigned to RB5 arranges the reference signal in RB1 which is apart from RB5 by ½ of all eight RB's. The same applies to the other RB's. According to these arrangements, the reference signals of all mobile stations are arranged in two RB's which are apart from each other by ½ of all RB's.

Further, in subframe N+1, the mobile station assigned to RB1 also arranges the reference signal in RB3 which is apart from RB1 by ¼ of all eight RB's. Further, the mobile station assigned to RB3 also arranges the reference signal in RB1 which is apart from RB3 by ¼ of all eight RB's. The same applies to the other RB's.

Further, in subframe N+2, the mobile station assigned to RB1 also arranges the reference signal in RB7 which is apart from RB1 by ½ of all eight RB's according to assignment in subframe 2. Further, the mobile station assigned to RB7 also arranges the reference signal in RB1. The same applies to the other RB's.

Further, in subframe N+3, the mobile station assigned to RB1 arranges the reference signal in RB2 which is apart from RB1 by ⅛ of all eight RB's. Further, the mobile station assigned to RB2 arranges the reference signal in RB1 which is apart from RB1 by ⅛ of all eight RB's. The same applies to the other RB's.

The same processing is carried out in subframes N+4 to N+6 and so will not be described.

In this way, each mobile station is able to compare RB's in order from RB's which are more likely to show little frequency correlation and so is able to select a preferable RB's earlier.

As described above, according to the present embodiment, the base station and mobile station each have a common table in which the correspondences between RB's and RB groups and the order of changes in the correspondences over time are set, and so RB group information needs not to be reported, so that it is possible to improve downlink throughput.

Embodiment 4

As described above, by providing a common table both in the base station and mobile station, RB group information needs not to be reported, so that it is possible to improve downlink throughput. However, patterns of rearrangement of RB groups are fixed to the patterns set in the table, and so, depending on the situation of communication, cases occur where adequate rearrangement is not possible.

Then, with the present embodiment, to efficiently achieve multiuser diversity gain in various communication situations, a plurality of tables matching situations of communication are stored in the base station and mobile station in common and are adaptively switched depending on the situation of communication.

Figure 14:
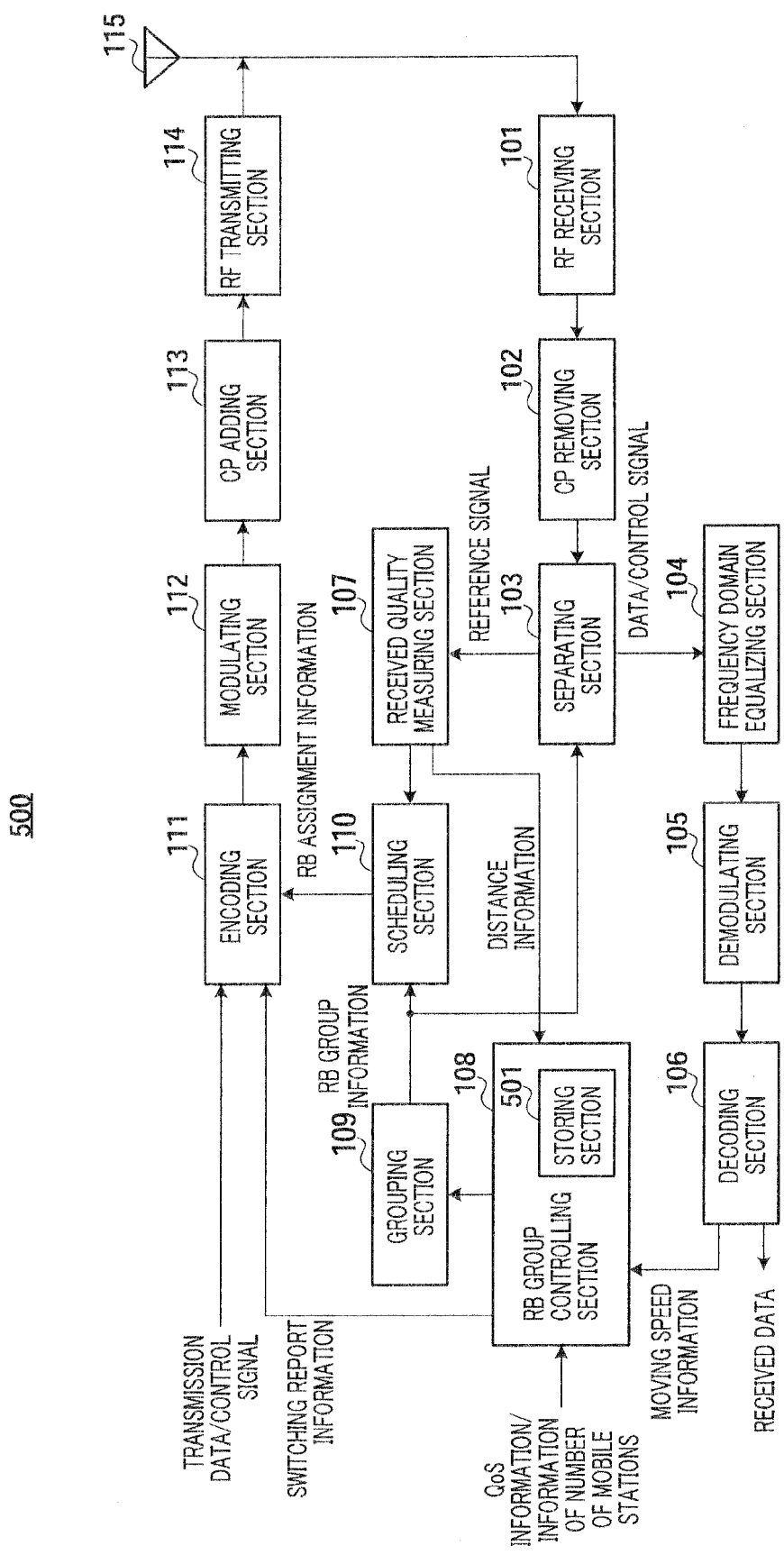
FIG. 14 is a block diagram showing a configuration of the base station according to Embodiment 4.

FIG. 14 is a block diagram showing a configuration of base station 500 according to the present embodiment. In the following description, only differences from Embodiments 1 to 3 will be described.

Separating section 103 separates the signal outputted from CP removing section 102 to the reference signal and a data/control signal, and outputs the reference signal to received quality measuring section 107 and the data/control signal to frequency domain equalizing section 104. Further, the number of RB's included in each RB group varies between subframes, and so RB group information is inputted to separating section 103 to correctly separate the reference signal from the received signal.

Storing section 501 stores a plurality of tables showing the correspondences between RB's and RB groups and the order of changes in the correspondences over time. One or both of the correspondences and the order of changes varies between these plurality of tables. Further, these plurality of tables may be configured to be stored in advance or added or updated from outside base station 500.

RB group controlling section 108 controls grouping section 109 to change the correspondences between a plurality of RB's and a plurality of RB groups over time based on the tables stored in storing section 501. In this case, RB group controlling section 108 receives as input, for example, QoS information, moving speed information, distance information, information of the number of mobile stations, CQI information showing the CQI of each mobile station or the average CQI and switches the table to be used, based on these pieces of information. Further, RB group controlling section 108 generates switching report information to report to each mobile station that the table to be used has been switched, and outputs this information to encoding section 111.

On the other hand, the mobile station (not shown) according to the present embodiment has, in addition to the components shown in FIG. 5, a storing section that stores a plurality of same tables as a plurality of tables stored in storing section 501 of base station 500 and a controlling section that carries out a control for switching the table to be used, and switches the table to be used, to the same table used in base station 500 according to switching report information reported from the base station.

Further, there is, for example, a specific switching method where different table numbers are allocated to a plurality of stored tables, base station 500 reports one of the table numbers to the mobile station as switching report information and the mobile station selects the table to be used, based on the reported table number.

In this way, according to the present embodiment, uplink frequency scheduling can be adaptively carried out depending on the situation of communication, and switching report information only needs to be reported only when the table is switched, so that it is possible to reduce the amount of downlink reported information.

Embodiment 5

Generally, there are a plurality of mobile stations of difference moving speeds in the communication system. In this case, the fluctuation of fading over time is moderate in mobile stations of low moving speeds. Consequently, in terms of improvement of uplink throughput, preferably, a mobile station determines the transmission interval between reference signals based on the moving speed, and, based on decision in the mobile station, selects whether "to transmit the reference signal" or "to transmit data" in a region where the reference signal is assigned by the base station.

With the present embodiment, the mobile station detects the moving speed thereof and adaptively changes an arrangement of the reference signal and transmission data according to the detected moving speed.

Figure 15:
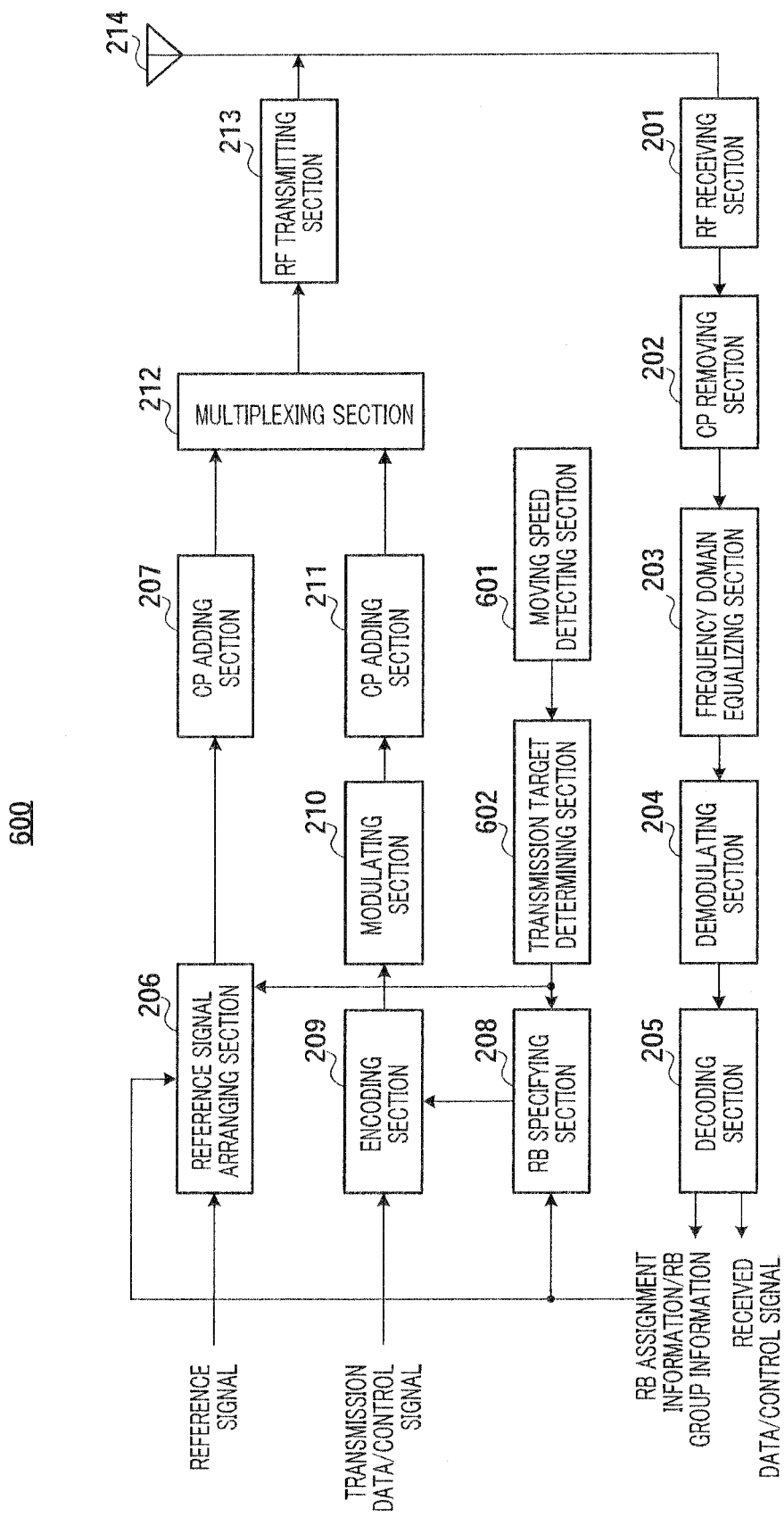
FIG. 15 is a block diagram showing a configuration of the mobile station according to Embodiment 5.

FIG. 15 is a block diagram showing a configuration of mobile station 600 according to the present embodiment. In the following description, only differences from Embodiment 1 will be described.

Moving speed detecting section 601 detects the moving speed of the mobile station 600 and generates moving speed information.

Transmission target determining section 602 determines whether to transmit the reference signal or to transmit data in the region where the reference signal is assigned, using the moving speed information and RB group information. To transmit the reference signal, transmission target determining section 602 reports the arrangement of the reference signal to reference signal arranging section 206, and to transmit data, reports the arrangement of transmission data to RB specifying section 208.

Figure 16:
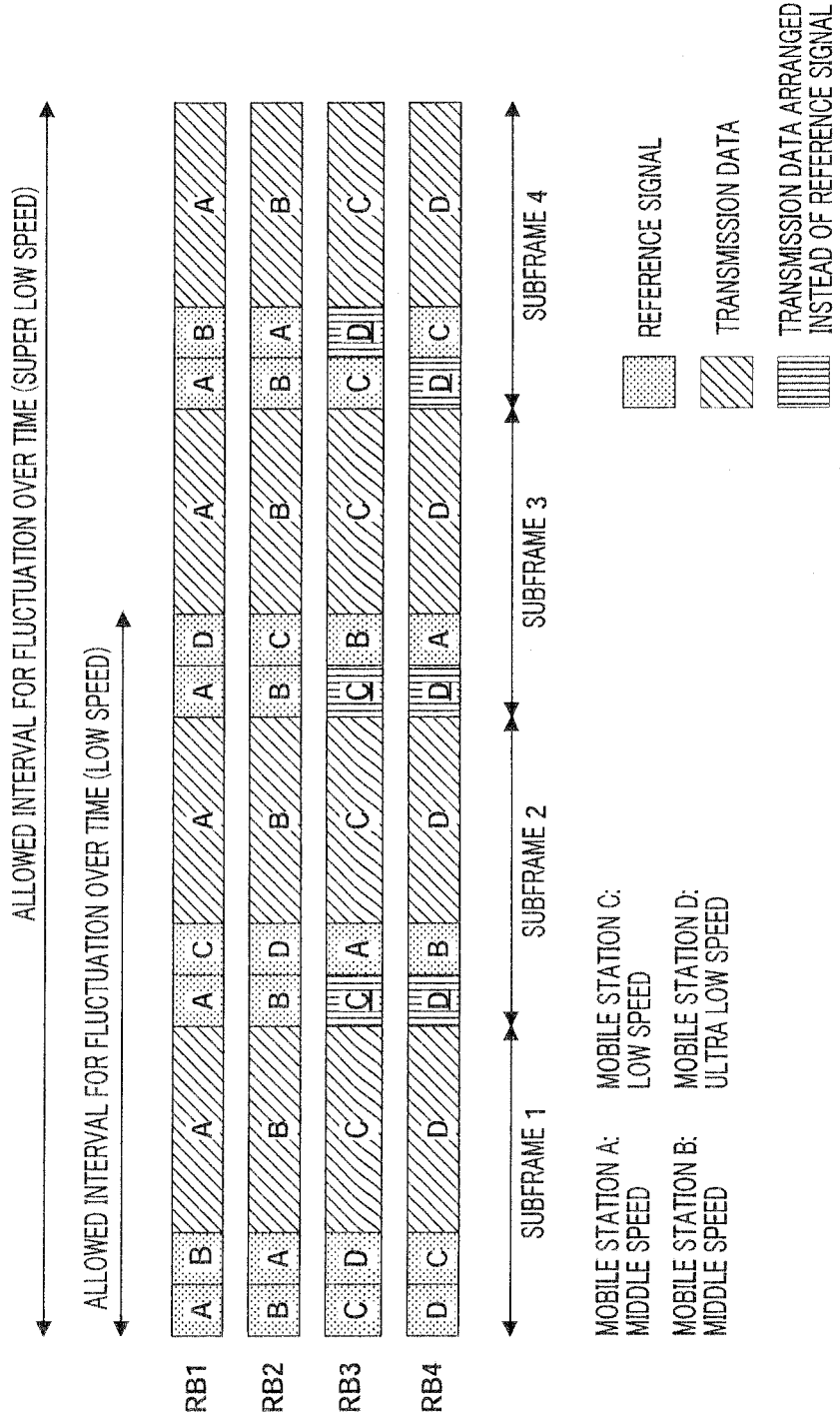
FIG. 16 is an operation diagram of the communication system according to Embodiment 5.

FIG. 16 shows the operation diagram of the communication system according to the present embodiment. In this case, the number of RB's is four (RB1 to RB4), and there are four mobile stations A to D of different moving speeds. Further, in portions shown by underlined A to D of FIG. 16, the received qualities fluctuate little over time, and the received qualities in these portions and the received qualities measured up to earlier subframes are almost equal.

The mobile station is able to predict the fluctuation of received quality over time from the detected moving speed and decide the transmission interval between the reference signals. For example, if the moving speed of mobile station C is low, mobile station C does not need to update the received quality for three subframes and is able to decide that the reference signal needs not to be transmitted using the assigned RB. Based on this decision, the mobile station determines whether to transmit the reference signal or transmit data in a region assigned by the base station for the reference signal.

Further, if the reference signal is not arranged in the received signal, the base station may decide that the received signal is data, or may perform decision by adding bits showing whether a data signal from the mobile station is the reference signal or data, to the data signal. Further, based on the scheduling result in an earlier subframe, the base station is able to decide which RB is used by a mobile station of a low speed to transmit the reference signal, and therefore may decide whether a signal to be transmitted is transmission data or the reference signal based on this decision. For example, in a case where a given mobile station moves at a low speed, does not transmit the reference signal using the same RB in three subframes and instead arranges transmission data in RB's, the base station checks within the three subframes whether there is a reference signal transmitted by the mobile station using the RB's, and, if there is, utilizes the received quality of this reference signal again. In this case, the moving speed range and the transmission interval between reference signals matching this moving speed range are set in advance, and, only when the transmission interval changes following changes in the moving speed, each mobile station may report the changes in the transmission interval, to the base station.

Further, the mobile station may measure the fluctuation of received quality over time instead of the moving speed, and determine whether to transmit the reference signal or transmit data based on this measurement value.

In this way, according to the present embodiment, a mobile station changes the transmission interval between reference signals based on the moving speed thereof, so that the mobile station is able to replace unnecessary reference signals with data and improve throughput.

Embodiment 6

For some structures of the communication system, the bandwidth used in each mobile station is not even, and there are a plurality of mobile stations using different bandwidths in one communication system. In this situation, grouping of RB's and scheduling are likely to be complicated. Consequently, in this situation, it is preferable to bring together a plurality of mobile stations using narrow bandwidths as one mobile station and make the RB bandwidths even.

Then, with the present embodiment, scheduling section 110 of the base station brings together into one a plurality of mobile stations that use narrower RB bandwidths than the standard RB bandwidth and carries out scheduling by making the RB bandwidths even.

Figure 17:
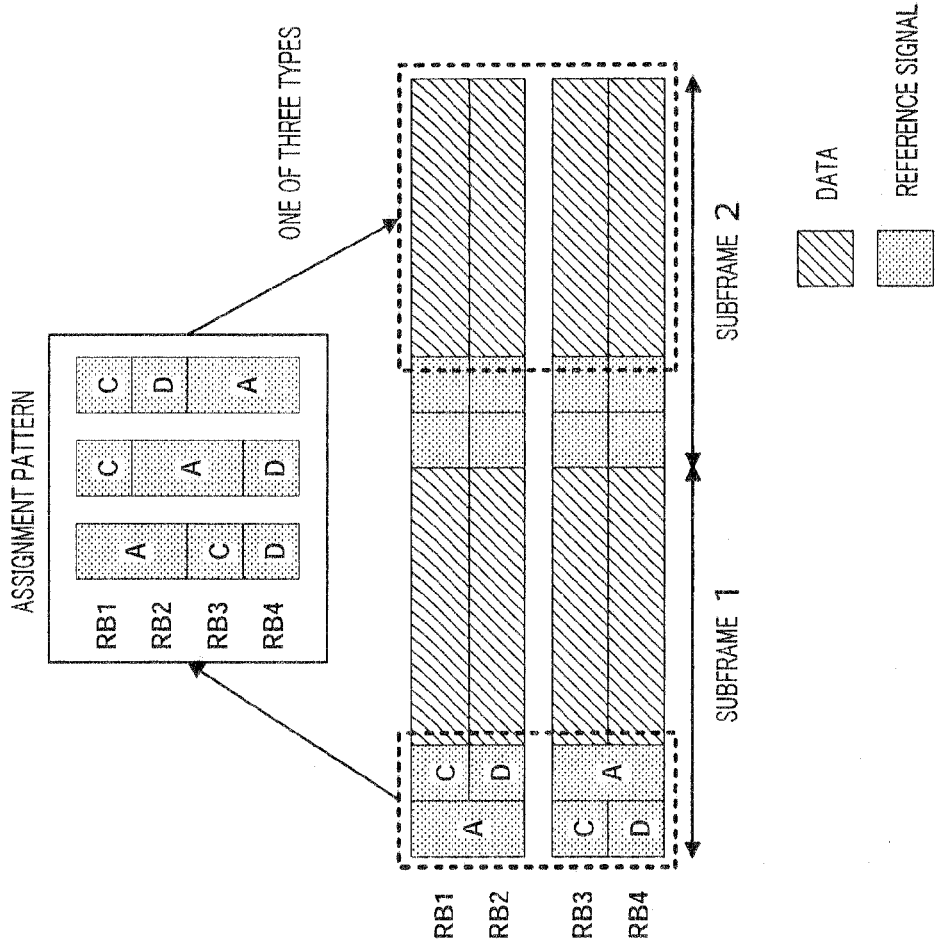
FIG. 17 is an operation diagram of the communication system according to Embodiment 6.

FIG. 17 is an operation diagram of the communication system according to the present embodiment. FIG. 17 shows a case where there are mobile station A that carries out communication using a bandwidth of 2.5 MHz and mobile station C and mobile station D that carry out communication using a bandwidth of 1.25 MHz. Further, 2.5 MHz is the scheduling standard, and mobile station C and mobile station D are brought together and are used as one set with the bandwidth of 2.5 MHz. That is, the base station assigns the regions for transmitting reference signals to the RB group including mobile station A and mobile stations C+D (the number of RB's in the RB group is two), and reports the result to each mobile station. The base station measures the received qualities of these reference signals and assigns regions for transmission data of mobile stations. The transmission data region assignment pattern can be selected from the three assignment patterns in FIG. 17.

In this way, according to the present embodiment, if there are a plurality of mobile stations using different bandwidths, by bringing together as one set a plurality of mobile stations that use narrower bandwidths than the standard and making their bandwidths even to the standard bandwidth, it is possible to efficiently carry out scheduling.

Embodiments of the present invention have been described.

Further, although the above embodiments have been described assuming single carrier transmission where there are a plurality of RB's, the present invention is not limited to this, and each mobile station may arrange using frequency division multiplexing or multicarriers the reference signal in the RB to which each mobile station is assigned, and transmit a reference signal.

Further, although a case has been described with the above embodiments where reference signals are transmitted at a plurality of times in one subframe, for example, at times Tn and Tn+1 in FIG. 7, the present invention is not limited to this. For example, a reference signal may be transmitted at a given time in the first subframe, and another reference signal may be transmitted at a given time in the second subframe following the first subframe. That is, by using a plurality of RB's over a plurality of subframes as one RB group, combinations of RB's forming the RB group may be changed over time. In this way, reference signals may be transmitted at a plurality of times over a plurality of subframes.

Further, if reference signals are transmitted at a plurality of times over a plurality of subframes as described above, data of the first subframe may be assigned to the RB of a high received quality, that is, to the RB of received quality 2 in case of received quality 1<received quality 2, and data of the second subframe may be assigned to the RB of a low received quality, that is, to the RB of received quality 1 in case of received quality 1<received quality 2. Further, the reference signals and data may be transmitted using the same RB between subframes. Further, in a plurality of subframes, the reference signals may be transmitted using a plurality of RB's included in the RB group and data may be transmitted using one of a plurality of RB's included in an RB group.

Further, a plurality of subframes in the above embodiments may be continuous or discontinuous.

Further, in scheduling to assign RB's to a plurality of mobile stations in the RB group, the RB's may be assigned such that the received qualities of all of a plurality of mobile stations increase or the RB's may be assigned based on the received quality of one specific mobile station in a plurality of mobile stations. For example, in a RB group, based on the received quality of a mobile station of a high priority, RB's may be assigned to a plurality of mobile stations including other mobile stations of lower priorities.

Further, received quality is not limited to the SINR, and the SIR, SNR, CIR, CNR, CINR, RSSI, received intensity, received power, interference power, error rate, transmission rate, throughput, the amount of interference or MCS that realizes a predetermined error rate may be used as received quality. Further, the CQI may be used as received quality.

Furthermore, the base station and mobile station according to the above embodiments may be referred to as Node B and UE, respectively.

Each function block employed in the description of each of the above embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2006-099914, filed on Mar. 31, 2006, including the specification, drawings and abstract, is incorporated herein by reference in its entirety.

INDUSTRIAL APPLICABILITY

The present invention is applicable for use in, for example, a mobile communication system.

The invention claimed is:

1. A radio communication base station apparatus comprising:
a grouping section that divides a plurality of resource blocks into a plurality of groups, wherein each of the plurality of groups includes one or more of the plurality of resource blocks;
a storing section that stores a plurality of tables showing correspondences between each of the plurality of groups and the one or more of the plurality of resource blocks included in each of the plurality of groups and a changing order of the correspondences, wherein the changing order varies between the tables;
a controlling section that switches a table to be used from among the plurality of tables and changes correspondences between the plurality of groups and the one or more of the plurality of resource blocks included in each of the plurality of groups over time based on the switched table;
a scheduling section that carries out scheduling to assign a radio communication mobile station apparatus to a resource block included in one of the plurality of groups; and
a transmission section that transmits a report of a scheduling result indicating the assigned resource block included in the one of the plurality of groups and a report of switching of the table, to the radio communication mobile station apparatus.

2. The radio communication base station apparatus according to claim 1, wherein the controlling section changes the correspondences periodically.

3. The radio communication base station apparatus according to claim 1, wherein the controlling section changes a number of the resource blocks included in each of the plurality of groups over time.

4. The radio communication base station apparatus according to claim 3, wherein the controlling section changes the number of the resource blocks based on one of qualities of service of transmission data, moving speeds of the radio communication mobile station apparatus, distances between the radio communication base station apparatus and the radio communication mobile station apparatus, a number of radio communication mobile station apparatuses in a communication system, channel quality indicators of the radio communication mobile station apparatuses and an average channel quality indicator.

5. The radio communication base station apparatus according to claim 1, wherein the correspondences are changed such that adjacent resource blocks do not belong to a same group successively.

6. The radio communication base station apparatus according to claim 1, wherein the controlling section carries out the switching based on one of qualities of service of transmission data, moving speeds of the radio communication mobile station apparatus, distances between the radio communication base station apparatus and the radio communication mobile station apparatus, a number of radio communication mobile station apparatuses in a communication system, channel quality indicators of the radio communication mobile station apparatuses and an average channel quality indicator.

7. The radio communication base station apparatus according to claim 1, wherein the scheduling section carries out scheduling such that an addition result of signal to interference and noise ratios of reference signals is maximized in each of the plurality of groups.

8. The radio communication base station apparatus according to claim 7, wherein the scheduling section assigns weights to the signal to interference and noise ratios according to priorities set to the radio communication mobile station apparatus.

9. The radio communication base station apparatus according to claim 8, wherein the priorities are set based on one of qualities of service of transmission data, moving speeds of the radio communication mobile station apparatus, distances between the radio communication base station apparatus and the radio communication mobile station apparatus, a number of radio communication mobile station apparatuses in a communication system, channel quality indicators of the radio communication mobile station apparatuses and an average channel quality indicator.

10. The radio communication base station apparatus according to claim 1, wherein the scheduling section carries out scheduling by bringing together as one a plurality of the radio communication mobile station apparatuses that use narrower resource block bands than a standard resource block band, and making resource block bandwidths even.

11. The radio communication base station apparatus according to claim 1, wherein the transmission section transmits an array number of each group as the report of the scheduling result.

12. A radio communication mobile station apparatus comprising:
    a reception section that receives a report of a scheduling result indicating an assigned resource block included in one of a plurality of groups from a radio communication base station apparatus;
    a specifying section that specifies the assigned resource block included in the one of the plurality of groups to which the radio communication mobile station apparatus belongs based on the report; and
    a transmission section that transmits a reference signal using the assigned resource block in the one of the plurality of groups to which the radio communication mobile station apparatus belongs out of the plurality of groups formed by dividing a plurality of the resource blocks, to the radio communication base station apparatus,
    wherein correspondences between each of the plurality of groups and one or more of the plurality of resource blocks included in each of the plurality of groups are changed over time, wherein:
    the reception section receives a report of the correspondences between each of the plurality of groups and the one or more of the plurality of resource blocks included in each of the plurality of groups; and
    the transmitting section transmits the reference signal using an assigned resource block specified by the report of the correspondences.

13. The radio communication mobile station apparatus according to claim 12, further comprising:
    a storing section that stores a table showing the correspondences between each of the plurality of groups and the one or more of the plurality of resource blocks included in each of the plurality of groups and a changing order of the correspondences over time, and
    a specifying section that specifies the assigned resource block included in one of the plurality of groups to which the radio communication mobile station belongs based on the table.

14. The radio communication mobile station apparatus according to claim 13, wherein:
    the storing section stores a plurality of the tables where the order of changes varies between the tables;
    the reception section receives a report of switching of the table transmitted from the radio communication base station apparatus; and
    the radio communication mobile station apparatus further comprises a controlling section that switches a table to be used in the plurality of tables based on the report of the switching.

15. The radio communication mobile station apparatus according to claim 12, further comprising:
    a detecting section that detects a moving speed of the radio communication mobile station apparatus; and
    a determining section that determines whether to transmit the reference signal or transmit data based on the moving speed.

16. The radio communication mobile station apparatus according to claim 12, wherein the reference signal is arranged using frequency division multiplexing or multicarriers.

17. The radio communication base station apparatus according to claim 1, wherein the scheduling section carries out the scheduling based on received qualities of reference signals transmitted from a plurality of radio communication mobile station apparatuses.

18. The radio communication mobile station apparatus according to claim 12, wherein the transmission section transmits data to the radio communication base station apparatus using a resource block corresponding to the scheduling result.

19. A communication method performed by a radio communication base station apparatus, the communication method comprising:
    dividing a plurality of resource blocks into a plurality of groups, wherein each of the plurality of groups includes one or more of the plurality of resource blocks;
    storing a plurality of tables showing correspondences between each of the plurality of groups and the one or more of the plurality of resource blocks included in each of the plurality of groups and a changing order of the correspondences, wherein the changing order varies between the tables;
    switching a table to be used from among the plurality of tables;
    changing correspondences between the plurality of groups and the one or more of the plurality of resource blocks included in each of the plurality of groups over time based on the switched table;
    scheduling to assign a radio communication mobile station apparatus to a resource block included in one of the plurality of groups; and
    transmitting a report of a scheduling result indicating the assigned resource block included in the one of the plurality of groups and a report of the switching of the table, to the radio communication mobile station apparatus.

20. A communication method performed by a radio communication mobile station apparatus, the communication method comprising:
    receiving a report of a scheduling result indicating an assigned resource block included in one of a plurality of groups from a radio communication base station apparatus;
    specifying the assigned resource block included in the one of the plurality of groups to which the radio communication mobile station apparatus belongs based on the report; and
    transmitting a reference signal using the assigned resource block in the one of the plurality of groups to which the radio communication mobile station apparatus belongs out of the plurality of groups formed by dividing a plurality of the resource blocks, to the radio communication base station apparatus,
    wherein correspondences between each of the plurality of groups and one or more of the plurality of the resource blocks included in each of the plurality of groups are changed over time, wherein:
    receiving a report of the scheduling result further comprises receiving of the correspondences between each of the plurality of groups and the one or more of the plurality of resource blocks included in each of the plurality of groups; and transmitting the reference signal further comprises transmitting the reference signal using the specified assigned resource block specified by the report of the correspondences.

\* \* \* \* \*